D. W. BRUNTON.
Leaching Ores.
No. 228,032.        Patented May 25, 1880.
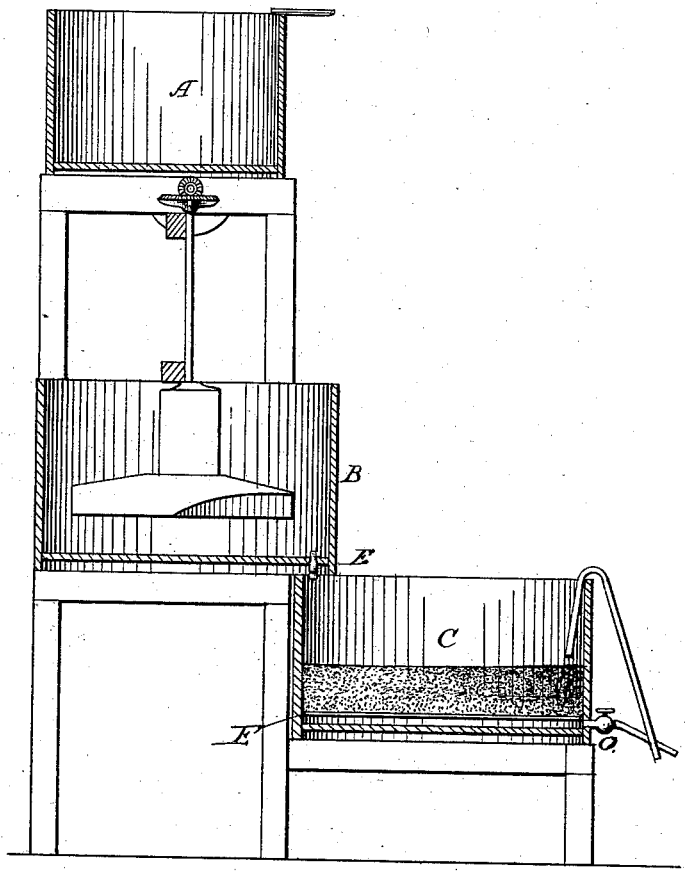

UNITED STATES PATENT OFFICE.

DAVID W. BRUNTON, OF SILVER PEAK, NEVADA.

LEACHING ORES.

SPECIFICATION forming part of Letters Patent No. 228,032, dated May 25, 1880.

Application filed September 23, 1878.

*To all whom it may concern:*

Be it known that I, DAVID W. BRUNTON, of Silver Peak, Esmeralda county, Nevada, have invented a new and useful Improvement in Leaching Ores; and I hereby declare the following to be a full, clear, and exact description thereof, reference being had to the accompanying drawing, in which the figure represents a vertical section of the apparatus.

Heretofore the leaching of ores has been practiced in one of two ways:

First, known as "filtration." In this method, in order to allow the liquor to permeate the ore freely after roasting, very coarse crushing was necessary, which rendered high chlorinations impossible.

Second, known as "agitation." To crush the ore to the finest division, roast it, and then treat it in tubs with the leaching-liquor and agitate it until the chloride of silver was dissolved. The whole mass was then allowed to settle, and the liquor on the surface was drawn off. The remaining liquor—sixty (60) or seventy (70) gallons per ton—with which the ore is saturated, and the silver contained therein, is lost.

Neither of these processes has been successfully operative in a practical way for the following reasons: In process first the coarse crushing of the ore prevented such a furnace-chlorination, owing to the size of the particles, as to render impossible the chloridization of a high percentage of the silver in the ore, and the silver thus lost kept the process from being profitably worked. In process second, though the ore was crushed sufficiently fine to obtain a good chlorination, the loss of silver due to the loss of the silver-containing liquor with which the ore is saturated (sixty to seventy gallons per ton) after the surface-liquor is drawn off, prevented a profitable working.

The object of my invention is to provide a certain and complete means for extracting the precious metals from their ores, and relates to that class of processes known as "leaching" processes.

My invention consists in a series of steps carried out in conjunction with proper apparatus, whereby I successfully and remuneratively leach the precious metals from finely-divided ores roasted at a low temperature, so that the base-metal chlorides formed in the roasting remain in the body of the ore.

My invention further consists in a leaching process wherein the solvent liquor is made by the solution of base-metal chlorides formed in the roasting of the ore being treated.

In order that those skilled in the art may make and use my invention, I will proceed to describe the exact manner in which I have carried it out.

In the drawing, A is a supply-tub to hold the base-metal chloride leaching-liquor, arranged above the tub B. A required quantity of the base-metal chloride solution is run from tub A into tub B. The revolving stirrer in tub B is then put in motion, and as it revolves the hot roasted ore from the furnace is fed into the leaching-liquor until the required amount is immersed. The revolution of the agitator or stirrer continues until the chloride of silver in the roasted ore is dissolved, which takes usually from four (4) to six (6) hours. Then, by means of a plug, E, in the bottom of tub B, the charge of ore and leaching-liquor, now charged with argentic chloride, is drawn into a filter-tub, C, which is provided with a false perforated bottom, F. In this tub C the charge is allowed to settle until the particles of ore sink to the false bottom of the filter-tub. Then the greater portion of the argentiferous liquor will be at the top, and it is drawn off by a siphon.

In drawing the silver-containing liquor from tub C, after the siphon has exhausted all that is upon the surface there still remains an amount due to the saturation of the finely-pulverized ore, and this I remove by flushing the top of the mass of ore with pure water, and as the liquor is of greater specific gravity than the water, it is forced toward the bottom of the tub or displaced by the water.

In roasting the ores at a low temperature I neither lose any of the silver nor base-metal chlorides formed in the roasting of the ore. These base-metal chlorides, formed in the roasting of the ore, are soluble, and when water is added to the ore they dissolve and form a solution which is a solvent for argentic chloride. Thus I utilize the base-metal chlorides formed in roasting the ore in making a solution which dissolves the chloride of silver.

It will be apparent to metallurgists that the process described has great advantages, in that it allows me to use successfully finely-divided ores, which can be roasted at a low temperature, just sufficient for chloridization, and thus avoid the volatilization of the base-metal chlorides and consequent loss of silver; that the base-metal chlorides formed in roasting the ore are utilized as solvents of the argentic chloride, and that a maximum percentage of the silver is secured.

Having thus described my invention, what I claim as new, and desire to secure by Letters Patent, is—

1. The process of recovering argentic chloride from finely-divided ores, which consists in dissolving out the chloride of silver in one tub, and then passing the mingled ore and silver-containing liquor into another tub, allowing the mass to settle, decanting the surface-liquor, and forcing out the liquor of saturation by flushing with pure water, substantially as described.

2. In the process of leaching silver chlorides, the method of obtaining a solution of the chloride, consisting in roasting the ore in fine division at a low temperature, and dissolving the base-metal chlorides from the body of the roasted ore and adding this solution to the ore containing the argentic chloride, as set forth.

In witness whereof I have hereunto set my hand this 25th day of August, A. D. 1878.

DAVID W. BRUNTON.

Witnesses:
P. L. WAVER,
FRED. CONN.